(12) United States Patent
Rovati et al.

US007617494B2

(10) Patent No.: US 7,617,494 B2
(45) Date of Patent: Nov. 10, 2009

(54) PROCESS FOR RUNNING PROGRAMS WITH SELECTABLE INSTRUCTION LENGTH PROCESSORS AND CORRESPONDING PROCESSOR SYSTEM

(75) Inventors: Fabrizio Simone Rovati, Cinisello Balsamo (IT); Antonio Maria Borneo, Matera (IT); Danilo Pietro Pau, Sesto San Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 852 days.

(21) Appl. No.: 10/612,825

(22) Filed: Jul. 1, 2003

(65) Prior Publication Data
US 2004/0059894 A1 Mar. 25, 2004

(30) Foreign Application Priority Data
Jul. 2, 2002 (EP) ................................. 02425437

(51) Int. Cl.
*G06F 9/45* (2006.01)
(52) U.S. Cl. .................. 717/159; 717/149; 712/215
(58) Field of Classification Search ............... 717/136, 717/140, 149, 150; 712/28, 215, 216; 718/102, 718/103, 105, 106
See application file for complete search history.

(56) References Cited
U.S. PATENT DOCUMENTS
5,031,096 A * 7/1991 Jen et al. .................... 711/169
5,129,077 A * 7/1992 Hillis .......................... 712/13

(Continued)

FOREIGN PATENT DOCUMENTS
EP 0 768 602 A2 4/1997

(Continued)

OTHER PUBLICATIONS
Biglari-Abhari, M., et al. "Improving Binary Compatibility in VLIW Machines through Compiler Assisted Dynamic Rescheduling," Proceedings of the Euromicro Conference, Sep. 5-7, 2000, pp. 386-393, Euromicro 26, vol. 1, Los Alamitos, CA.

*Primary Examiner*—Lewis A Bullock, Jr.
*Assistant Examiner*—Jue S Wang
(74) *Attorney, Agent, or Firm*—Lisa K. Jorgenson; Timothy L. Boller; Seed IP Law Group PLLC

(57) ABSTRACT

The program to be executed is compiled by translating it into native instructions of the instruction-set architecture of the processor system, organizing the instructions deriving from the translation of the program into respective bundles in an order of successive bundles, each bundle grouping together instructions adapted to be executed in parallel by the processor system. The bundles of instructions are ordered into respective sub-bundles, said sub-bundles identifying a first set of instructions, which must be executed before the instructions belonging to the next bundle of said order, and a second set of instructions, which can be executed both before and in parallel with respect to the instructions belonging to said subsequent bundle of said order. There is defined a sequence of execution of the instructions in successive operating cycles of the processor system, assigning each sub-bundle to an operating cycle, thus preventing simultaneous assignment to the same operating cycle of two sub-bundles belonging to the first set of two successive bundles. The instructions of the sequence may be executed by the various processors of the system in conditions of binary compatibility.

19 Claims, 9 Drawing Sheets

U.S. PATENT DOCUMENTS

| | | | |
|---|---|---|---|
| 5,634,135 A * | 5/1997 | Hollander | 712/205 |
| 5,787,302 A | 7/1998 | Hampapuram et al. | |
| 5,951,674 A | 9/1999 | Moreno | |
| 6,044,450 A * | 3/2000 | Tsushima et al. | 712/24 |
| 6,272,481 B1 * | 8/2001 | Lawrence et al. | 706/45 |
| 6,298,370 B1 | 10/2001 | Tang et al. | 718/102 |
| 6,367,067 B1 | 4/2002 | Odani et al. | |
| 6,615,339 B1 | 9/2003 | Ito et al. | |
| 6,651,082 B1 * | 11/2003 | Kawase et al. | 718/105 |
| 6,792,560 B2 * | 9/2004 | Francis et al. | 714/30 |
| 6,799,266 B1 | 9/2004 | Stotzer et al. | 712/219 |
| 6,892,293 B2 | 5/2005 | Sachs et al. | |
| 6,950,926 B1 * | 9/2005 | Menezes | 712/216 |
| 6,988,183 B1 | 1/2006 | Wong | |
| 7,062,634 B1 * | 6/2006 | Southwell et al. | 712/24 |
| 2003/0200421 A1 | 10/2003 | Crook et al. | |
| 2004/0039900 A1 * | 2/2004 | Heishi et al. | 712/234 |
| 2004/0054882 A1 | 3/2004 | Borneo et al. | 712/300 |

FOREIGN PATENT DOCUMENTS

| | | |
|---|---|---|
| EP | 0 924 603 A2 | 6/1999 |
| EP | 1 102 166 A2 | 5/2001 |
| EP | 1 152 329 A1 | 11/2001 |
| EP | 1 324 191 | 7/2003 |
| GB | 2332075 A * | 9/1999 |
| WO | WO 00/33186 | 6/2000 |
| WO | WO 01/53933 A2 | 7/2001 |

* cited by examiner

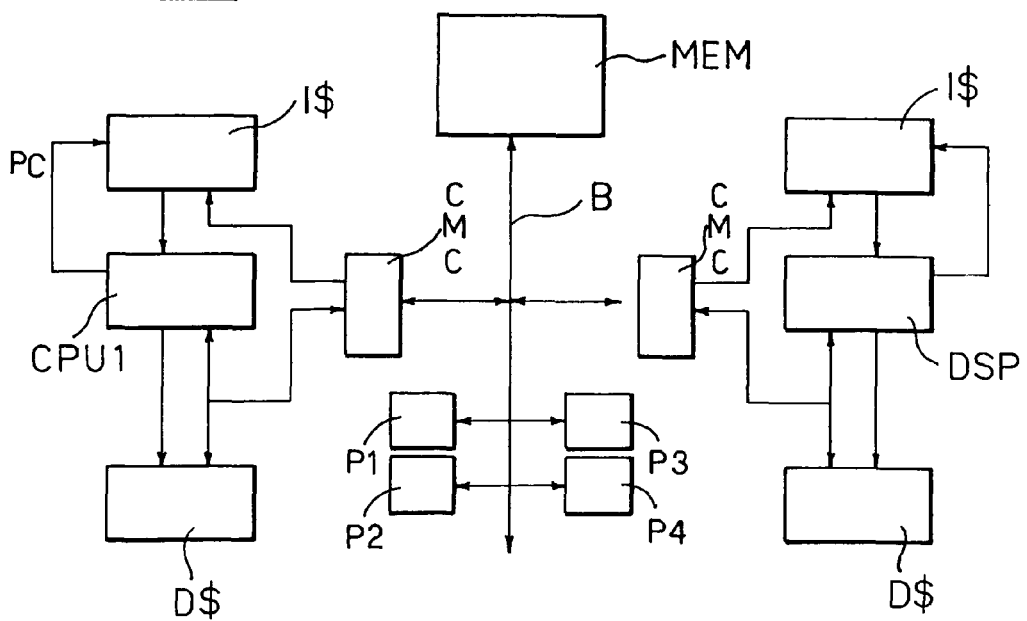
Fig_1
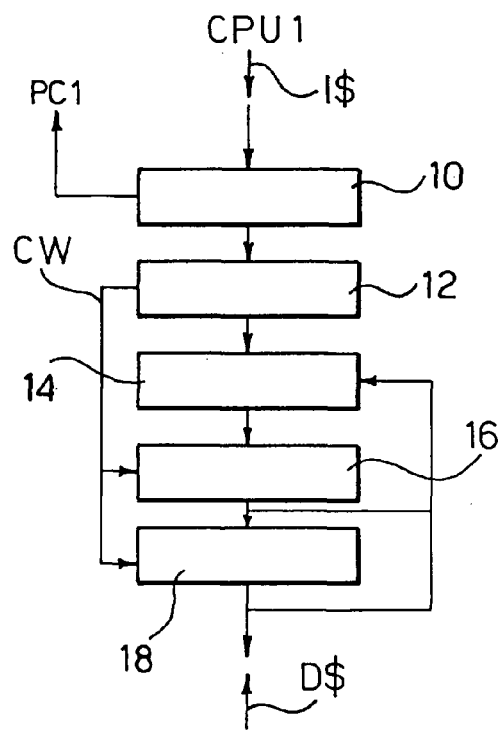
Fig_2

Fig_3
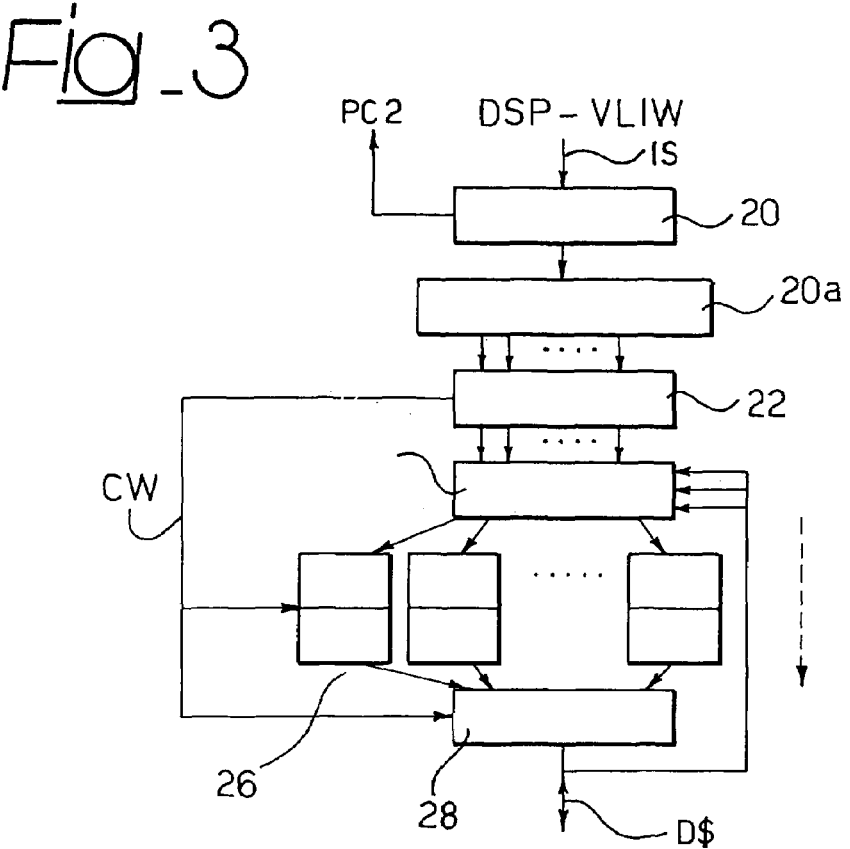
Fig_4
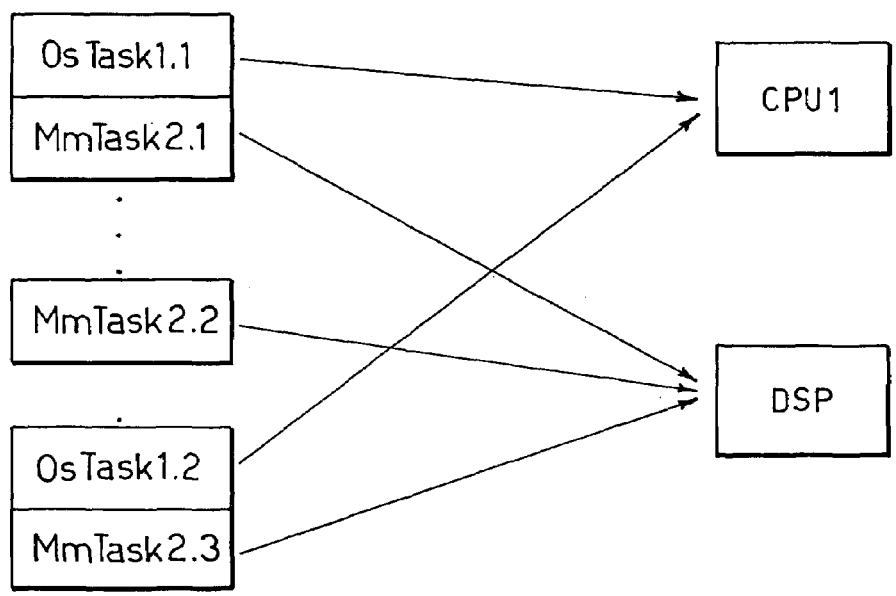

Fig_5
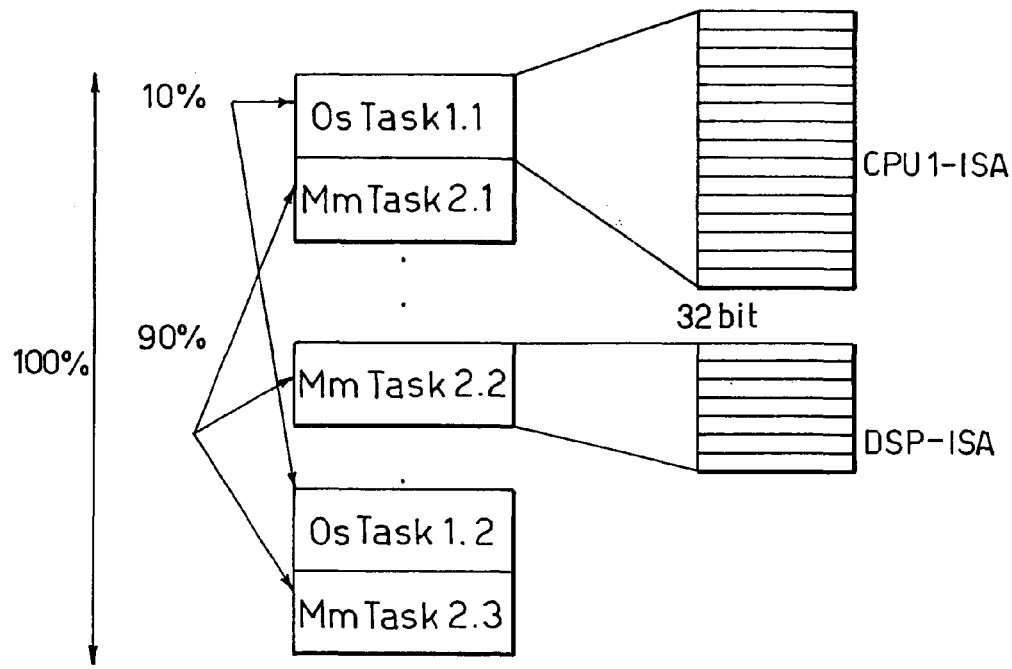
Fig_6
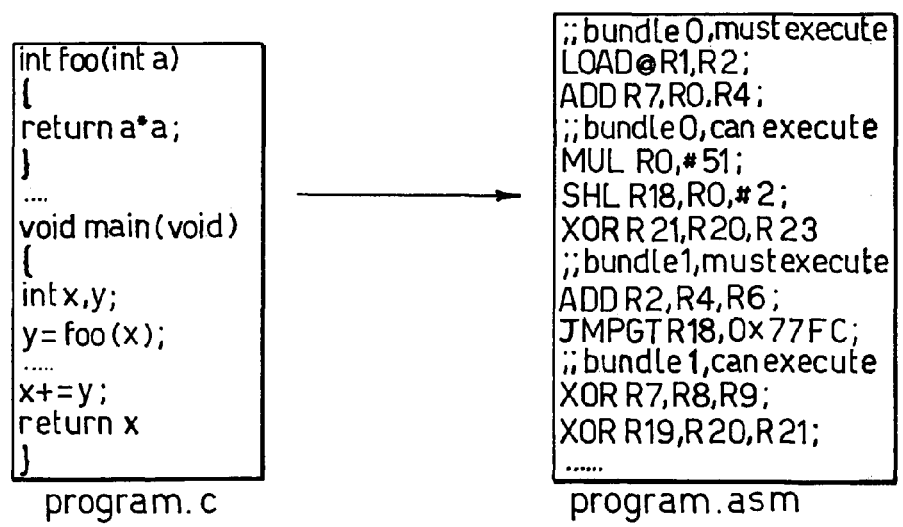

Fig_7

Bundle0 [i_0|i_1| i_2 | i_3 | i_4 ]
Bundle1 [i_5|i_6| i_7 | i_8 | i_9 | i_10]
Bundle2 [i_11|i_12|i_13|i_14|i_15|i_16|i_17|i_18|i_19]
Bundle3 [i_20|i_21|i_22|i_23|i_24|i_25|i_26]

Fig_8

Bundle0M [i_0|i_1]
Bundle0C        [i_2|i_3|i_4]

Bundle1M [i_5|i_6]
Bundle1C        [i_7|i_8|i_9|i_10]

Bundle2M [i_11|i_12|i_13|i_14|i_15]
Bundle2C                    [i_16|i_17|i_18|i_19]

Bundle3M [i_20|i_21|i_22]
Bundle3C              [i_23|i_24|i_25|i_26]

Fig_9

| | |
|---|---|
| [OM_0｜OM_1｜OC_0｜OC_1] | Sub-Bundle OM, sub-Bundle OC: allowed |
| [OC_0｜1M_0｜1M_1｜1C_0] | Sub-Bundle OC, sub-Bundle 1M, sub-Bundle 1C: allowed |
| [OC_0｜OC_1｜OC_2｜1M_0] | Sub-Bundle OC, sub-Bundle 1M: allowed |
| [OM_0｜OC_0｜1M_0｜1M_1] | Sub-Bundle OM, sub-Bundle OC, sub-Bundle 1M: NOT ALLOWED |

⬇

[OM_0｜OC_0]
[1M_0｜1M_1｜i_...｜i_...]

Fig_10

| | |
|---|---|
| [i_0｜i_1｜i_2｜i_3] | Bundle OM, Bundle OC |
| [i_4｜i_5｜i_6｜i_7] | Bundle OC, Bundle 1M, Bundle 1C |
| [i_8｜i_9｜i_10｜i_11] | Bundle 1C, Bundle 2M |
| [i_12｜i_13｜i_14｜i_15] | Bundle 2M |
| [i_16｜i_17｜i_18｜i_19] | Bundle 2C |
| [i_20｜i_21｜i_22｜i_23] | Bundle 3M, Bundle 3C |
| [i_24｜i_25｜i_26｜...] | Bundle 3C, etc.... |

Fig_11
| | |
|---|---|
| [i_0 i_1 i_2 i_3 i_4] | Bundle 0M, Bundle 0C |
| [i_5 i_6 i_7 i_8 i_9 i_10] | Bundle 1M, Bundle 1C |
| [i_11 i_12 i_13 i_14 i_15 i_16 i_17 i_18] | Bundle 2M, Bundle 2C |
| [i_19 i_20 i_21 i_22 i_23 i_24 i_25 i_26] | Bundle 2C, Bundle 3M, Bundle 3C |
Fig_12
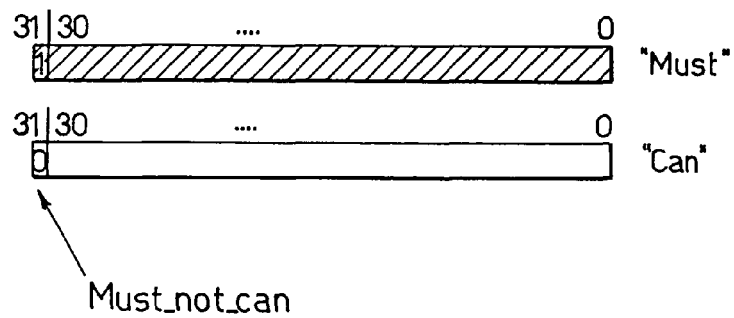

Fig_13
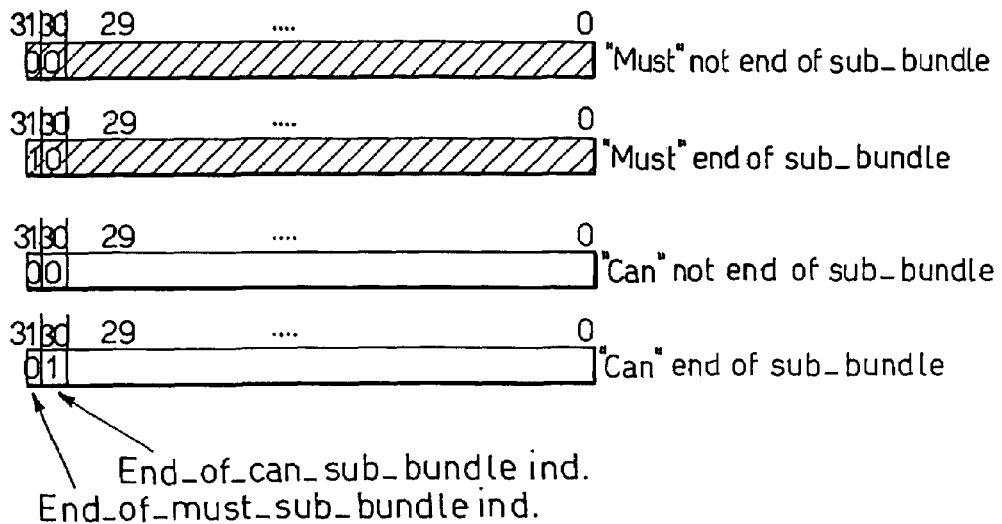
Fig_14
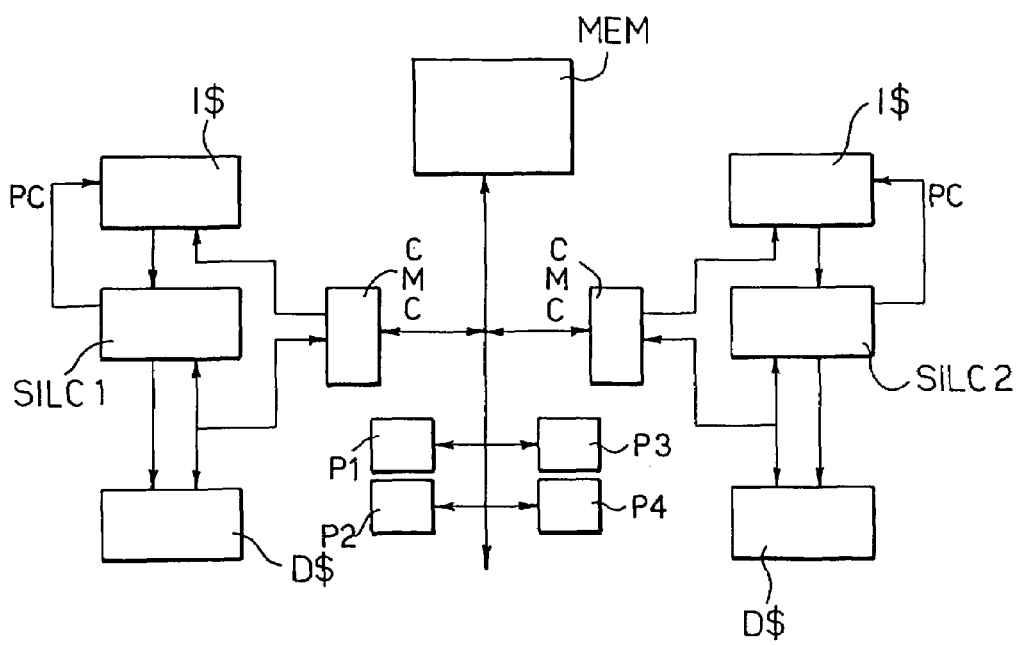

Fig_15
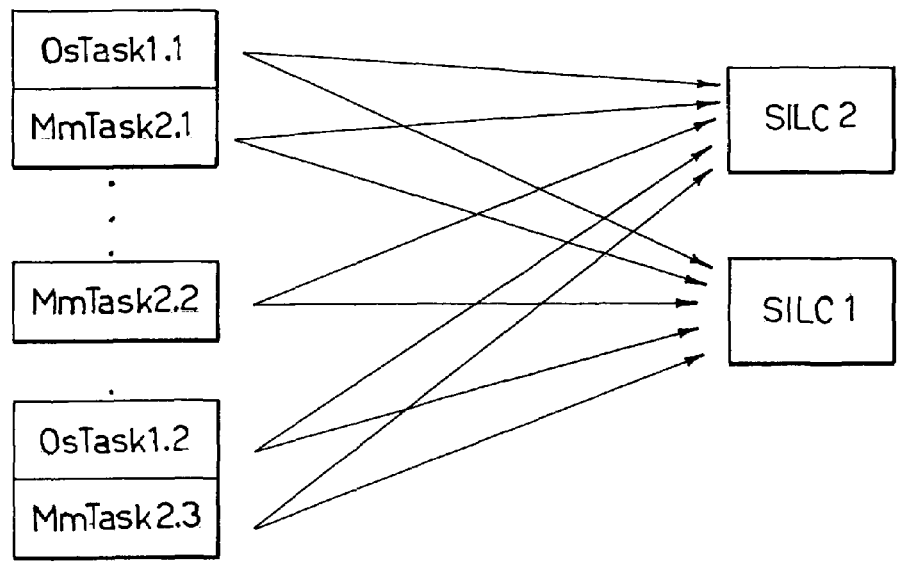
Fig_16
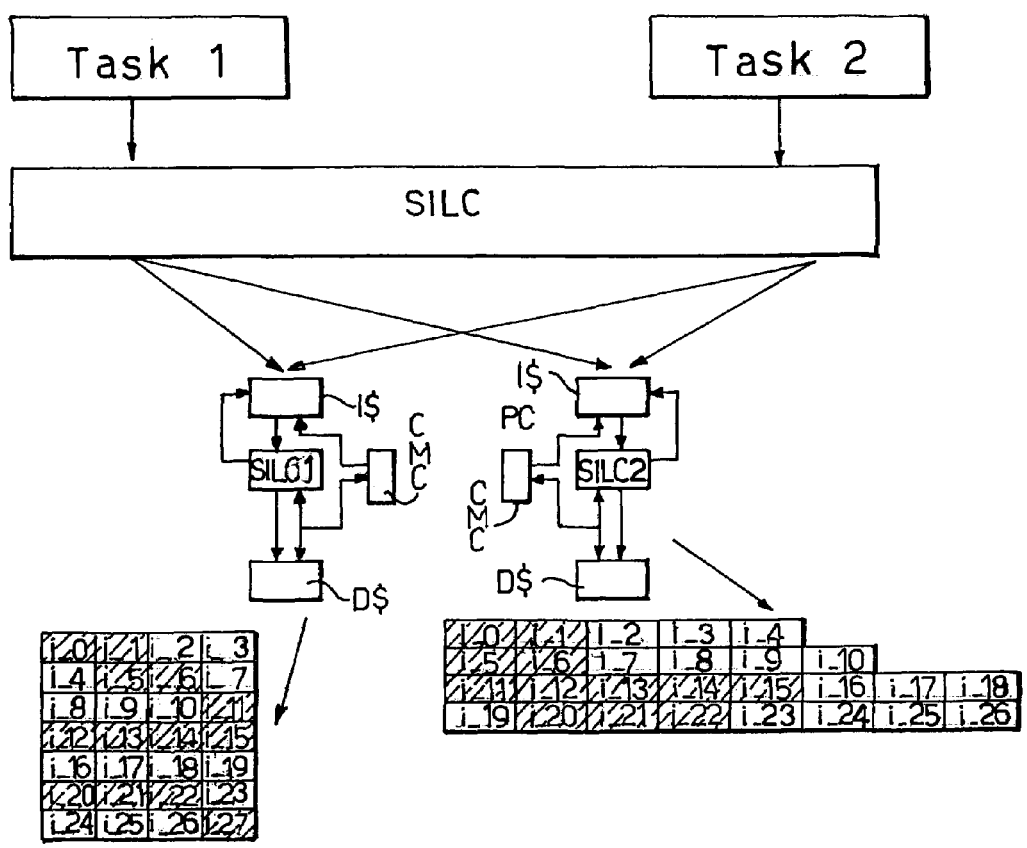

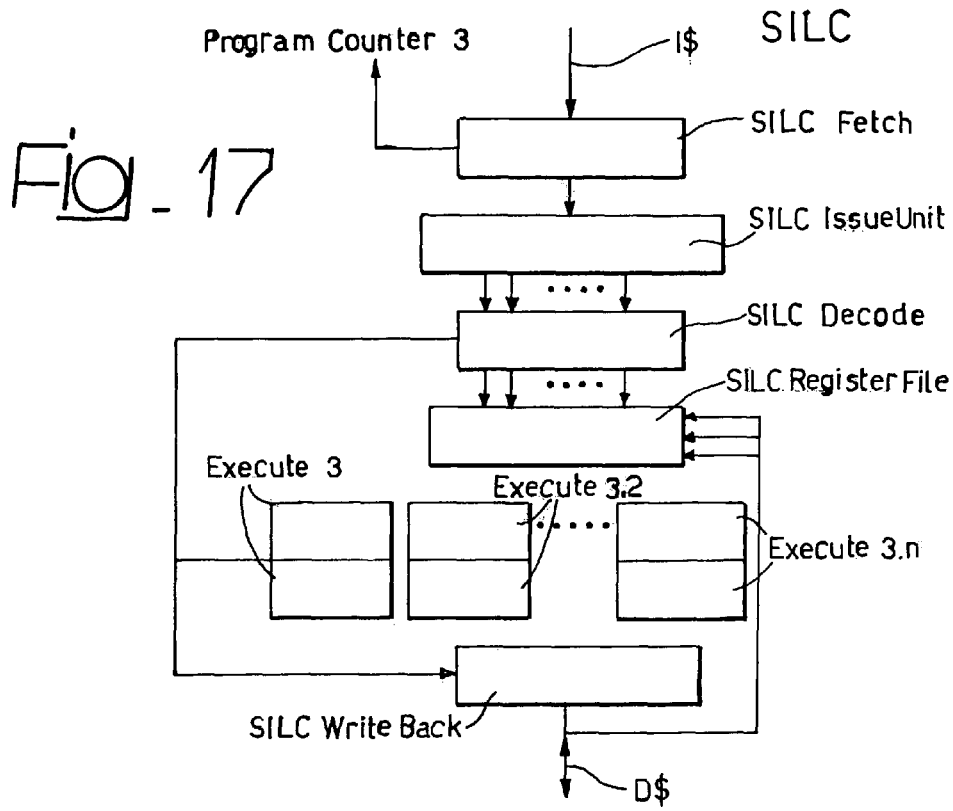
Fig_17
Fig_18
| Process | Num. | CPU load | Exec time | Memory | Current execution | Context memory address |
|---|---|---|---|---|---|---|
| SystemIdleProcess | 0 | 52 | 4:18:39 | 16K | 1 | 0x1234123A |
| System | 2 | 02 | 0:00:37 | 200K | 2 | 0x3E586321 |
| SMSS.EXE | 26 | 00 | 0:00:00 | 0K | 2 | 0xFFC0A867 |
| CSRSS.EXE | 34 | 00 | 0:00:06 | 908K | 1 | 0xAFE25432 |
| WINLOGON.EXE | 40 | 00 | 0:00:01 | 32K | 1 | 0xCECC4223 |
| SERVICES.EXE | 43 | 00 | 0:00:01 | 1044K | 1 | |

PROCESS FOR RUNNING PROGRAMS WITH SELECTABLE INSTRUCTION LENGTH PROCESSORS AND CORRESPONDING PROCESSOR SYSTEM

FIELD OF THE INVENTION

The present invention relates to processors and methods for processing signals that can be implemented using said processors.

DESCRIPTION OF PRIOR ART

In cell-phone systems of the second generation (for example GSM) or of a more advanced type (GPRS, EDGE, UMTS), the most widely used architecture consists of a system made up of two processors. The first processor, which is specialized in handling the part with the largest computational burden, typically consists of a Digital Signal Processor or DSP. The other processor, with tasks of control, synchronization and execution of high-level applications, is typically configured as a CPU.

An example of architecture of this sort is illustrated in FIG. 1, where the aforesaid processors, designated respectively by DSP and CPU 1, are illustrated together with the cache memories associated thereto, namely together with instruction cache memories I$ and data cache memories D$, respectively.

Designated by CMC are the interface modules, referred to as Core Memory Controllers, which enable two sub-systems coming under the two processors DSP and CPU 1 to interface with one another by means of a main bus B with the main system memory MEM and with the various peripheral units P1, P2, P3, P4, . . . associated to the system.

The specific application in the telephony sector is, on the other hand, referred to herein purely in order to provide an example and consequently does not imply, even indirectly, any limitation of the altogether general character of the invention described in what follows. The said invention may, in fact, be applied in all those fields in which it may be useful or advantageous to employ a microprocessor.

With reference to the diagram of FIG. 1, the CPU 1 is typically a 32-bit pipelined scalar microprocessor. By "pipelined scalar" is meant that its internal architecture is made up of different logic stages, each of which contains an instruction in a very specific state. The said state may be that of:

fetching of the instruction from the memory,
decoding of the instruction,
addressing of a register file,
execution,
writing/reading of data from the memory.

The number of bits on which the CPU 1 operates is related to the width of the data on which the machine is operating. The instructions are generated and executed in turn, in a specific order defined by compiling.

The other processor, designated by DSP, is typically a superscalar microprocessor or 128-bit pipelined VLIW (acronym for Very Long Instruction Word) microprocessor.

"Pipelined superscalar" means that its internal architecture is made up of different logic stages, some of the which are able to execute instructions in parallel, for example in the execution step. Typically, the parallelism is of four instructions each (equal to 128 bit) whilst the data are expressed in 32 bits.

The processor is said to be superscalar if the instructions are reordered dynamically in the execution step in order to supply the execution stages which can potentially work in parallel, also altering the order generated statically by compiling of the source code, if the instructions do not present any mutual dependence. The main disadvantage of this approach lies in the complexity of the resulting machine, in which the logic of scheduling of the instructions may prove one of the most important parts in terms of number of gates.

The term VLIW processor is used if the instructions are re-ordered statically in the compiling step and executed in the pre-set order, which is not modifiable in the execution step. The advantage of the said approach is that it eliminates all the logic of management of the scheduling since this task is performed during compiling.

The main disadvantage lies in the fact that the compiled code is strictly dependent upon the implementation of the machine on which it is executed. For example, given the same instruction-set architecture (ISA), a machine with N execution units cannot execute a compiled code for a machine with K execution units if K is not equal to N. From this it follows that there is no "binary compatibility" between different generations of processors with the same ISA.

It is to be recalled that by "binary compatibility" is meant the property existing between a group of processors each of which is able to execute one and the same binary machine-code datum.

Likewise, it is not possible to create multiprocessor systems (each with a different number of execution units), which can change processes in the course of execution.

In the diagram of FIG. 1, each processor possesses its own data cache D$ and its own instruction cache I$, so as to be able to load from the main memory MEM both the data on which to operate and the instructions to be executed in parallel. Since the two processors CPU 1 and DSP are connected to the main memory MEM through the system bus B, the two processors are typically found competing for access to said memory when an instruction and/or the data on which they are to operate must be located in the main memory, the said instruction or data not being available in their own caches.

A system based upon the architecture represented in FIG. 1 has a sharing of work and of processes that is rigid and not modifiable, such as to render asymmetrical the workload and the software programs to be executed.

By way of reference, a processor such as the CPU 1 usually possesses 16 Kbytes of data cache and 16 Kbytes of instruction cache, whereas the DSP usually possesses 32 Kbytes of data cache and 32 Kbytes of instruction cache.

The flowchart of FIG. 2 illustrates the logic diagram of the CPU described from top to bottom. The first stage, designated by 10, generates the memory address to which the instruction to be executed is associated, the said address being referred to as program counter. The stage 10 is hence configured typically as a fetch stage, whilst the instruction thus loaded is decoded in the stage 12 separating the bit field which defines its function (for example, addition of 2 values contained in two registers located in the register file) with respect to the bit fields which address the operands. The said addresses are sent to a register file from which (in a stage designated by 14) are read the operands of the instruction. The operands and the bits which define the function to be executed are sent to the execution unit which, in a stage 16, performs the desired operation, for example the operation of addition referred to previously. The result can thus be re-stored in the register file in a stage 18 currently called write-back stage.

The process schematically represented in FIG. 2 operates in combination with a load/store unit which enables reading/writing of any possible data in memory with the aid of specific instructions dedicated to the purpose.

It may be readily appreciated that the set of instructions is in biunique correspondence with a given microprocessing CPU architecture.

The flowchart of FIG. 3 shows, instead, the logic diagram of the DSP. Also in this case, there is envisaged an initial fetch stage 20, associated to which there is logically cascaded a stage 20a for issuing instructions. The reference number 22 designates, instead, a decoding stage whilst the reference number 24 designates a register file (see the stages 14 and 16 of FIG. 2). The reference number 28 designates a stage for re-storage in the register file, which is in general akin to the stage 18 of FIG. 1. In the diagram of FIG. 3 the reference number 26 designates collectively a plurality of execution stages that can be executed in parallel.

Both in FIG. 1 and in FIG. 3 the reference CW designates the branching lines of the control words.

It will be appreciated that the main difference between the diagram of FIG. 2 and the diagram of FIG. 3 is provided by the fact that the diagram of FIG. 3 envisages the possibility of working in parallel on different sets of instructions. Another difference lies in the fact that the diagram of FIG. 3 envisages the use of a greater number of execution units available, which can operate in parallel in a superscalar and VLIW processor. In both cases, the set of instructions is in biunique correspondence with a given microprocessing architecture.

Assuming that the two sets of instructions designed to be executed by the processors CPU 1 and DSP are different from one another (as is commonly the case with the architecture of wireless processors) it is understandable that instructions (and hence tasks to be executed), which can be executed the processor CPU 1 cannot be executed by the DSP, and vice versa.

For the above to be possible, it is necessary to compile each process for each processor, thus increasing the memory of the program. Whenever a process is to be executed by a specific processor, it is then necessary to load and execute the code of the particular task that has been compiled for that processor. There is moreover encountered the problem linked to the fact of having to correlate the different points of partial execution of the programs when they are to be shifted from one processor to another (i.e, re-map the program counters correctly) and of having to convert all the processing data from the representation system of one processor to the representation system of another (for example, the contents of the state and general-purpose registers).

The above problems are difficult to solve, so that in general a process is compiled and executed on a single processor.

With reference to FIGS. 4 and 5, it is possible to consider a sequence of sets of instructions of said processes.

In general, two types of processes are distinguished, namely:

those corresponding to the operating system and to applications that use calls to functions of the operating system, and those regarding the processing of multimedia (audio/video/graphic) contents.

Specifically, in the diagram of FIG. 4 the references OsTask 1.1, 1.2, etc. illustrate processes which can be executed by the processor CPU 1. The processes designated by MmTask2.1, MmTask2.2, MmTask2.3, identify, instead, processes compiled so as to be executed by the DSP.

Starting from the diagram of FIG. 4, which illustrates a possible assignment of the task to two processors, it is immediately possible to return to the diagram of FIG. 5, which illustrates the corresponding flow of instructions.

Setting equal to one hundred the total time of execution of the processes, it is noted that the first processes typically last 10% of the time, whilst the second occupy a much greater part, corresponding to 90%.

Again, the first processes contain instructions generated by the compiler of the processor CPU 1 and hence can be executed by the latter, but not by the DSP. For the latter processes the situation is exactly complementary, in the sense that they contain instructions generated by the compiler of the DSP and can hence be executed by the said processor, but not by the other processor CPU 1.

It is moreover to be noted that the processor CPU 1 is characterized by a compiling flow of its own, which is independent of and distinct from that of the DSP.

Given the modest workload, it may be appreciated that the processor CPU 1 could even be turned off when not in use, so enabling a considerable energy saving.

The above hypothetical solution (switching-off of the processor CPU 1 when it is not being used) comes up, however, against the fact that the corresponding switching-off or powering-down procedures introduce additional processing latencies and these are added to the value of 10% mentioned previously. The aforesaid procedures envisage in fact:

switching off the processor CPU 1, except for the respective register file by gating the clock signal which supplies all the internal registers;

switching off the processor CPU completely, except that power supply is maintained for the cache memories; and switching off the CPU as a whole, including the data and instructions caches.

However, given that the state of the individual processor must be restored when the latter is turning back on following upon one of the operations referred to previously, the latencies introduced vary from tens of microseconds to tens or hundreds of milliseconds. The above latencies prove particularly costly, both from the energy standpoint and from the computational standpoint.

Finally, the DSP is forced to work at approximately 90% of its computational capacity. This implies an evident asymmetry in the workload of the processor CPU as compared to the workload of the DSP, an asymmetry which is revealed also in the power-management algorithms, which are distinct for the two processors.

SUMMARY OF THE INVENTION

The purpose of the present invention is to provide a solution capable of overcoming the drawbacks outlined previously.

According to the present invention, the said purpose is achieved thanks to a process having the characteristics referred to specifically in the claims that follow. The invention also regards the corresponding processor system, in particular multiprocessor system.

The present invention appears therefore both as a variant and as a possible integration with respect to the solution described in the European patent application No. 01830814.8.

Basically, the solution according to the invention enables instantiation of a new class of processors with instruction length selectable by the processor itself. The above is obtained by creating an architecture which can be defined, using a terminology introduced in the present description, as "Selectable-Instruction-Length Computer" (SILC), where the instruction-level parallelism (ILP) is statically extracted from the compiler.

The foregoing is, however, obtained in such a form as not to jeopardize binary compatibility between different SILC processors having the same instruction set architecture (ISA) but different parallelism of execution.

In addition, the code may be executed in an optimal number of cycles with respect to the maximum parallelism allowed by the processor.

The solution according to the invention thus enables, in principle, the following requirements to be met:

assurance of binary compatibility between two or more SILC processors having the same instruction set but different execution parallelism, this being obtained without using purposely dedicated complex hardware, as instead is the case in superscalar processors; and execution of programs indistinctly on two or more SILC processors constituting the system in dynamically variable working conditions, the said processors being characterized in that they present the same instruction set architecture (ISA), but a different maximum parallelism of instructions executable in a given cycle.

More specifically, the solution according to the invention affords the possibility of executing code compiled using a compiler which presents intrinsic parallelism at the level of code instructions, preserving the possibility of executing said code on machines that implement the same instruction set architecture (ISA), but with a different number of execution units. In this way, it is possible to have a different specification of the maximum number of instructions that can be performed in a single cycle.

The above result may be obtained with a processor operating according to the invention, consequently with a selectively determinable length of instructions, in conditions in which the compiler reveals the maximum parallelism at the instruction level inherent in the code and inserts into the compiled code signs or symbols (tokens) for identifying instructions which must be executed before others, as well as instructions which can be executed before others.

The decoding unit of the SILC processor selects, on the basis of the aforesaid symbols and of the maximum parallelism of the processor instance, how many instructions can be issued per cycle.

In this way, it is possible to achieve the following:

binary compatibility between different generations of processors that share the same instruction-set architecture (ISA) but with different implementations, with different numbers of execution units;

optimal performance for each processor with a different number of execution units: a processor with a higher execution parallelism will require fewer cycles to execute the same code, as compared to another processor with the same ISA but fewer execution units;

minimization of the hardware complexity by transferring the function of extraction of the parallelism at the moment of compiling; and availability of a multiprocessor system based upon an array of SILC processors which have the same ISA value but which implement different levels of parallelism, this being achieved with the added possibility of re-allocating dynamically the processes from one processor to another in order to minimize the global clock frequency of the system.

BRIEF DESCRIPTION OF THE ATTACHED DRAWINGS

The invention will now be described, purely by way of non-limiting example, with reference to the attached drawings, in which:

FIGS. 1 to 5, which substantially regard the prior art, have already been described previously;

FIG. 6 illustrates the working principle of a processor according to the invention, the explanation proceeding in FIGS. 7 to 13;

FIG. 14 illustrates a multiprocessor architecture that is able to implement the invention;

FIG. 15 illustrates the criteria of assignment of the tasks in the multiprocessor system of FIG. 14;

FIGS. 16 and 17 illustrate, in greater detail, the criteria of execution of the aforesaid tasks in the processor of FIG. 14; and FIG. 18 is an example of a table for execution of processes referring to a solution according to the invention.

DETAILED DESCRIPTION OF THE INVENTION

A processor according to the invention (hereinafter referred to by the acronym SILC) can be used to particular advantage in the context of a multiprocessor structure of the type represented in FIG. 14, to which we shall return in what follows.

Basically, a processor according to the invention presents the characteristic that, like a VLIW processor, it exploits the compiler to extract the parallelism at the instruction level and to reduce in this way the constructional complexity of the hardware.

Unlike what occurs in a normal VLIW processor, in the processor according to the invention the compiled code is not executable only on a processor with a given parallelism, as presupposed by the compiler, but can be executed by different SILC processors characterized by one and the same ISA but with different levels of parallelism. The foregoing is obtained, at the same time achieving levels of performance that increase as the maximum number of instructions that a processor executes in a single cycle increases.

A VLIW compiler must in fact know exactly how many execution units the processor for which it is compiling the code has and which ones these are. The aim of this is to generate the number of instructions that the processor must perform at each cycle. If, for instance, a processor with parallelism 4 is specified, the compiler tries to get up to four instructions per cycle to be executed. If the code is executed on a processor with parallelism 8, four units remain unused. Instead, such a code cannot be executed on a processor with just two execution units.

A superscalar processor uses, instead, dedicated hardware resources (which may be very costly) in order to understand how many instructions it can execute.

Consequently, the solution according to the invention maintains the flexibility of a superscalar processor, whilst eliminating the additional hardware complexity.

The compilation-execution flow of a SILC processor envisages the steps described in what follows.

In the first place, the compiler receives as input a program written, for example, in C code or in any other high-level language or even in assembler language.

Subsequently, the compiler translates the said program into native instructions of the processor. While carrying out the translation, the compiler extracts also the maximum parallelism, at the level of assembler instructions, intrinsic in the code (or, alternatively, up to any set maximum of instructions per cycle), or else indicates which instructions can be executed in parallel without this causing a variation in the behavior of the program due to any dependency of data upon one instruction or another.

Each set of instructions that can be executed in parallel is defined as a "bundle".

In so doing, the compiler does not assume anything specific as regards the number of execution units that the processor on which the code is being executed has available. The compiler extracts all the possible parallelism inherent in the code, or else up to a given number of instructions per cycle that may be deemed reasonable according to the options that may be entered at input to the compiler.

In each bundle, it is in general possible to distinguish two categories of instructions. The first of said categories comprises the instructions that must necessarily be executed before the ones belonging to the next bundle owing to the fact that the latter receive, at input, data processed by the former. This first type of instructions may be defined as "must" instructions. The other category of instructions consists of instructions that can be executed both before the next bundle and in parallel with the next bundle, in so far as they do not have any specific dependency upon the instructions present in the next bundle. This second type of instructions may be defined as "can" instructions.

In each bundle, there may be present a set (including the null or empty set, i.e., with zero instructions) of each of the two categories.

For instance, the diagram of FIG. 6 shows how a C code (represented on the left) is compiled in the set of native instructions of the SILC processor, extracting the maximum parallelism value, or else the maximum value of said parallelism up to a pre-defined upper limit, on the basis of the indications supplied to the compiler. The aforesaid maximum value is currently indicated by ILP. The instructions that can be executed in parallel are grouped together in the aforesaid bundles.

As is represented more clearly in FIG. 7, each set of instructions referred to as bundle is in general made up of both instructions that must necessarily be executed before execution of the next bundle and instructions that can be executed before the next bundle or else in parallel with the next bundle.

Consequently, the assembler instructions can be labeled as "must" instructions or "can" instructions according to the category in which the respective instruction is found. As has already been said, each bundle can contain any number (including zero) of instructions forming each set.

As a consequence of the partition described above, it is possible to define a sequence of sub-sets or sub-bundles of the "must" type or of the "can" type (each containing zero or more instructions) designed to alternate in the execution of the program, as is represented in FIG. 8.

At this point, any SILC processor that executes instructions from the set of instructions used by the compiler can execute the compiled code and can select automatically each time, through the indications of "must"/"can" sub-bundles given by the compiler, the length of instructions to be executed cycle by cycle, or else the number of assembler instructions to be executed in each cycle.

The processor selects the said length starting from a given set of rules, such as typically:

the processor always tries to load the maximum number of instructions that it can execute;

the processor can execute all the instructions loaded if and only if there are not present any "must" instructions belonging to different bundles (situations of conflict or "must-must hazard" situations). In the above case, it can execute only the instructions up to the first one corresponding to the second sub-bundle of a "must" type, excluding the latter. Instead, it will have to delay execution of the "must" instructions of the second bundle at the next cycle.

The diagrams of FIGS. 9 to 11 show typical examples of "mixtures" of different types of bundles and examples of the corresponding frequency of code execution on processors with parallelism 4 (FIGS. 9 and 10) and parallelism 8 (FIG. 11).

In particular, FIG. 9 refers to a generic flow of four sub-bundles 0M, 0C, 1 M and 1C, where M stands for "must" and C stands for "can".

In particular, proceeding from the top, it is noted that the first three examples lead to configurations for which it is possible to proceed immediately with the execution.

Instead, the fourth combination represented, in which a sub-bundle 0M is present, a sub-bundle 0C and a sub-bundle 1M cannot immediately receive granting of execution, in so far as a phenomenon of conflict or must-must hazard occurs.

In the above case, a splitting operation is performed by allocating the set sub-bundle 0M, sub-bundle OCX and the set sub-bundle 1MX on two different cycles, it being possible to add, during execution of the second cycle, other instructions of a "must" type or a "can" type of the same bundle 1.

FIG. 10 shows, instead, an example of execution of the compiled code illustrated in FIGS. 7 and 8 on a machine with four execution units, hence with parallelism 4.

The operation illustrated envisages an execution in seven cycles.

FIG. 11 refers, instead, to an example of execution of the same compiled code as the one shown in FIGS. 7 and 8 on a machine with parallelism 8, i.e., with eight execution units.

In the above case, the overall execution of the code envisages four cycles. During the first two cycles, it is not possible to execute more instructions than the ones represented, since execution in parallel of "must" instructions belonging to different bundles is forbidden, as it constitutes a must-must conflict event.

It may, therefore, be noted that the same code, compiled without referring to any particular parallelism of execution, can be executed on machines with different parallelisms, obtaining levels of performance which, obviously, scale with the number of execution units in parallel. Of course, the increase in the number of execution units available reduces the number of cycles necessary for execution.

The information regarding the different types of sub-bundles of a "must" type or "can" type can be encoded according to different criteria.

Some possible criteria are listed below by way of example.

As illustrated in FIG. 12, the meaning "must_not_can" can be assigned to one bit of the instruction. In this way, all the instructions belonging to the "must" sub-bundle will have said bit set at "1". All the instructions belonging to the "can" sub-bundle will have said bit set at "0". The passage from one sub-bundle to another is hence identified by inversion of said bit.

In the case where the number of instructions belonging to a "can" sub-bundle is zero, it becomes necessary to add a fictitious "can" instruction of a no-operation (nop) type in order to indicate the passage from one "must" bundle to another. The same occurs in the opposite case of two "can" bundles with interposition of a "must" bundle made up of zero instructions (even though this case, in actual fact, appears unlikely to occur). As an alternative, it is possible to assign the meaning of "last instruction of a "must" sub-bundle" and the meaning "last instruction of a "can" sub-bundle" to two distinct bits. This solution is illustrated schematically in FIG. 13.

In this way, an extra bit is used, but the need for introducing redundant instructions of a no-operation (nop) type in the case of presence of a zero-instruction sub-bundle is eliminated.

The solution according to the invention means that, for supporting execution of processors in a context such as the one illustrated previously with reference to FIG. 1, it is no longer necessary to use an asymmetrical multiprocessing architecture, in so far as it is possible to instantiate a low-parallelism SILC processor for the instructions normally performed by the CPU and a high-parallelism SILC processor for the functions which, in the diagram of FIG. 1, are performed by the DSP.

It is, then, convenient to define a new system architecture of the type illustrated in FIG. 14, where parts that are identical or are functionally equivalent to the ones illustrated in FIG. 1 are designated by the same reference numbers.

In particular, the places occupied in FIG. 1 by the processors CPU 1 and DSP are occupied in the diagram of FIG. 14 by two processors according to the invention designated by SILC 1 and SILC 2, respectively.

The architecture of FIG. 14 enables execution of the processes on both of the processors without having to recompile and duplicate the object codes for the two processors. This is possible because both of the processors SILC 1 and SILC 2 support the same instruction set, and the same binary code can be executed by machines that have different levels of parallelism of execution.

In particular, with reference to FIGS. 14 and 16, a first step is considered of compiling, using the SILC compiler, the source code of a process named OsTask 1.1 for the operating system. The said code is, in general, characterized by a low intrinsic value of the ILP parameter (see the description of FIG. 6) and can be executed by both of the processors. It is, however, evident that, if executed on a processor with high maximum parallelism, the execution time is not reduced much as compared with the situation that arises if a low-parallelism processor is used, on account of the low intrinsic ILP. The said task is, therefore, executed more efficiently on the processor SILC 1.

In addition, consider, in the same said first step of compiling, using the SILC compiler, the source code of a process named MmTask 2.1 for a multimedia audio/video/graphic application. The said code is, in general, characterized by a high intrinsic ILP and, as above, can be nominally executed by both of the processors. It is, however, evident that, if it is executed on a processor with high maximum parallelism, the execution time is reduced as compared to the situation that arises if a low-parallelism processor is used. This task is, therefore, executed more efficiently on the processor SILC 2.

FIG. 16 exemplifies what has been said above in the case where SILC 1 has a parallelism 4 and SILC 2 has a parallelism 8.

The instructions that make up the tasks of FIG. 15 are present in the system memory and are addressed by means of the program counter that each SILC possesses (see the diagram of FIG. 17).

An important advantage of the solution according the invention is the binary compatibility between the two processors, where the said compatibility is understood as the capacity for executing indistinctly the processes on the processors involved with different maximum parallelism of execution using the same compiled code, without useless duplications. The above capacity moreover enables dynamic distribution of the computational load on the two processors, so as to equalize the operating frequency of the processors with respect to the maximum, thus obtaining a saving in terms of dissipated power, which, as is well known, is linearly dependent upon the operating frequency of the processor.

In order to clarify better how it is possible to shift execution of a process from one SILC processor to another, consider the existence of a table stored in the system memory MEM.

With reference to FIG. 18, proceeding from left to right, the said table is made up of:

a list of processes (Process) that are being executed or are suspended on any single processor;

the progressive number (Num) thereof on the basis of the order of activation;

the percentage of maximum power (CPU load) of the processor that is used by said process;

the execution time (Exec.time);

the amount of memory (Memory) of the system used by the process to be able to execute the function for which it is responsible;

the processor on which the process currently resides (Current execution); and the address of the portion of memory in which the data and the instructions are stored, i.e., the operating context (Context memory address).

The above table is accessible by a process referred to as control process, which is executed for a pre-set time on one of the processors. The said process has the possibility of consulting and updating the table in order to equalize the workload of the respective processor with respect to the workload of the other processor or processors present in the system.

The solution according to the invention may, in fact, be extended to an arbitrary number of SILC processors which make up a system and each of which may have any maximum parallelism of execution whatsoever, where said length may vary from one processor to another.

The above table likewise contains the co-ordinates necessary for a processor to be able to take possession of and execute one of the processes mentioned.

Of course, without prejudice to the principle of the invention, the details of implementation and the embodiments may be amply varied with respect to what is described and illustrated herein, without thereby departing from the scope of the present invention, as defined in the annexed claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A process for executing programs on at least one processor having a given instruction set architecture, the process comprising the operations of:

compiling the program to be executed and translating said program into native instructions of said instruction set architecture, organizing the instructions deriving from the translation of said program into respective bundles arranged in an order of successive bundles, each bundle grouping together instructions adapted to be executed in parallel by said at least one processor, each bundle having a determined priority for execution by said at least one processor;

separating said bundles of instructions into respective sub-bundles by detecting a value of a binary symbol encoded in one of the instructions deriving from the translation of the program to be executed of the respective bundle, said sub-bundles identifying a first set of instructions, which must be executed before the instructions belonging to the next bundle of said order, and a second set of instructions that can be executed both before and in parallel with respect to the instructions belonging to said next bundle of said order, it being possible for at least said second set of instructions to be a null set;

defining a sequence of execution of the instructions of said sub-bundles in successive operating cycles of said at least one processor based on said determined priority carried by a designated number of bits encoded into each instruction, while preventing, in assigning each sub-bundle to an operating cycle of the processor, simultaneous assignment, to the same operating cycle, of two sub-bundles corresponding to instructions belonging to a first set of two successive bundles of said order; and executing said instructions on at least one said processor respecting said execution sequence.

2. The process according to claim 1, further comprising the operation of selectively varying the overall length of instruction executed for each cycle by said at least one processor.

3. The process according to claim 1, further comprising the operations of:
detecting when said second set is the null set; and
inserting in the respective sub-bundle a fictitious instruction which does not imply any execution of operations.

4. The process according to claim 1, wherein the binary symbol identifies the last instruction of the first set of a respective bundle and the separating said bundles of instructions into respective sub-bundles further comprises detecting a value of a second binary symbol encoded in a second instruction of the respective bundle, wherein the second binary symbol identifies the last instruction of the respective sub-bundle.

5. The process according to claim 1, for executing programs on a multiprocessor system comprising a plurality of processors having said instruction-set architecture, further comprising the operations of:
instantiating the processors of said plurality with respective degrees of parallelism of execution with at least two different values of said parallelism of execution in the context of said plurality; and
selectively distributing execution of the instructions of said sequence of execution among the processors of said plurality, the instructions of said sequence of execution being directly executable by the processors of said plurality in conditions of binary compatibility.

6. The process according to claim 5, further comprising the operation of selectively distributing the execution of the instructions of said sequence among the processors of said plurality, dynamically distributing the computational load of said processors.

7. The process according to claim 5, further comprising the operation of selectively distributing the execution of the instructions of said sequence among said processors of said plurality with the criterion of equalizing the operating frequency of the processors of said plurality.

8. The process according to claim 5, further comprising the operation of performing a process of control executed by at least one of the processors of said plurality so as to equalize its own workload with respect to the other processors of said multiprocessor system.

9. The process according to claim 8, further comprising the operation of drawing up a table accessible by said control process, said table having items chosen from the group made up of:

a list of processes that are being executed or are suspended on any processor of said plurality of processors;
the progressive number thereof according to the order of activation;
the percentage of maximum power of the processor that is used by said process;
the execution time;
the amount of memory of the system used by said process to be able to execute the function for which it is responsible;
the processor on which the process currently resides; and
the address of the portion of memory in which the data and the instructions are stored.

10. A processor system, preferably of a multiprocessor type, configured for operating with the process according to claim 1.

11. A process of executing programs on a system having a plurality of processors comprising:
compiling the program to be executed;
translating said program into instruction sets;
organizing said instruction sets into respective groups, each group having a predetermined priority for execution in a given processor of said plurality;
separating each group of instructions into a respective first sub-bundle of instructions which must be executed before the instructions belonging to the next group, and a respective second sub-bundle of instructions that can be executed before or in parallel with respect to the instructions belonging to said next group, it being possible for at least said second sub-bundle of instructions to be a null set;
encoding said instructions for execution on said processors;
providing in each encoded instruction a designated number of initial bits identifying said predetermined priority of the instruction set; and
wherein the execution of programs comprises directing of the sub-bundled instruction sets to said processors of said plurality according to the priority bits encoded into the said instruction set.

12. The process of claim 11, wherein said priority is determined based on the amount of memory required by each of the processors of said plurality to execute said instruction set.

13. The process of claim 11, wherein said priority is determined based on the amount of percentage of maximum power required by each of the processors of said plurality to execute said instruction set.

14. The process of claim 11, further comprising encoding a value of a binary symbol in a translated instruction of the program to be executed, the value indicating a boundary between the first sub-bundle and the second sub-bundle of the respective group of instructions.

15. The process of claim 11, further comprising encoding a value of a binary symbol into each translated instruction of the program to be executed, the value indicating the respective sub-bundle of the instruction.

16. A system comprising:
a plurality of processors coupled for receiving instruction sets, each instruction set containing one or more instructions; and
a first processor of the plurality coupled to an instruction stream and capable of directing said instruction sets to each of the processors of said plurality for execution including organizing said instruction sets into respective bundles arranged in an order of successive bundles, each bundle having a determined priority for execution in a given processor of said plurality, separating said bundles of instructions into respective sub-bundles by detecting a value of a binary symbol encoded in one of the instructions deriving from a translation of a program to be executed of the respective bundle, said sub-bundles identifying a first set of instructions, which must be executed before the instructions belonging to the next bundle of said order, and a second set of instructions that can be executed both before and in parallel with respect to the instructions belonging to said next bundle of said order, it being possible for at least said second set of instructions to be a null set;

said first processor configured to direct the sub-bundled instructions sets to the processors of said plurality based on priority values carried by a designated number of bits encoded into each instruction.

17. The system according to claim 16, wherein the priority for the instruction sets is based on the amount of memory required by each of the processors of said plurality to execute said instruction set.

18. The system according to claim 16, wherein the priority for the instruction sets is based on the amount of percentage of maximum power required by each of the processors of said plurality to execute said instruction set.

19. The system of claim 16 wherein the first processor is further configured to extract indications of sub-bundling of sets of instructions having respective priority values from the instructions and to determine, based on the extracted indications of sub-bundling, a number of instructions to be executed in each cycle.

* * * * *

UNITED STATES PATENT AND TRADEMARK OFFICE
CERTIFICATE OF CORRECTION

PATENT NO. : 7,617,494 B2 Page 1 of 1
APPLICATION NO. : 10/612825
DATED : November 10, 2009
INVENTOR(S) : Rovati et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1249 days.

Signed and Sealed this

Nineteenth Day of October, 2010

David J. Kappos
*Director of the United States Patent and Trademark Office*